UNITED STATES PATENT OFFICE.

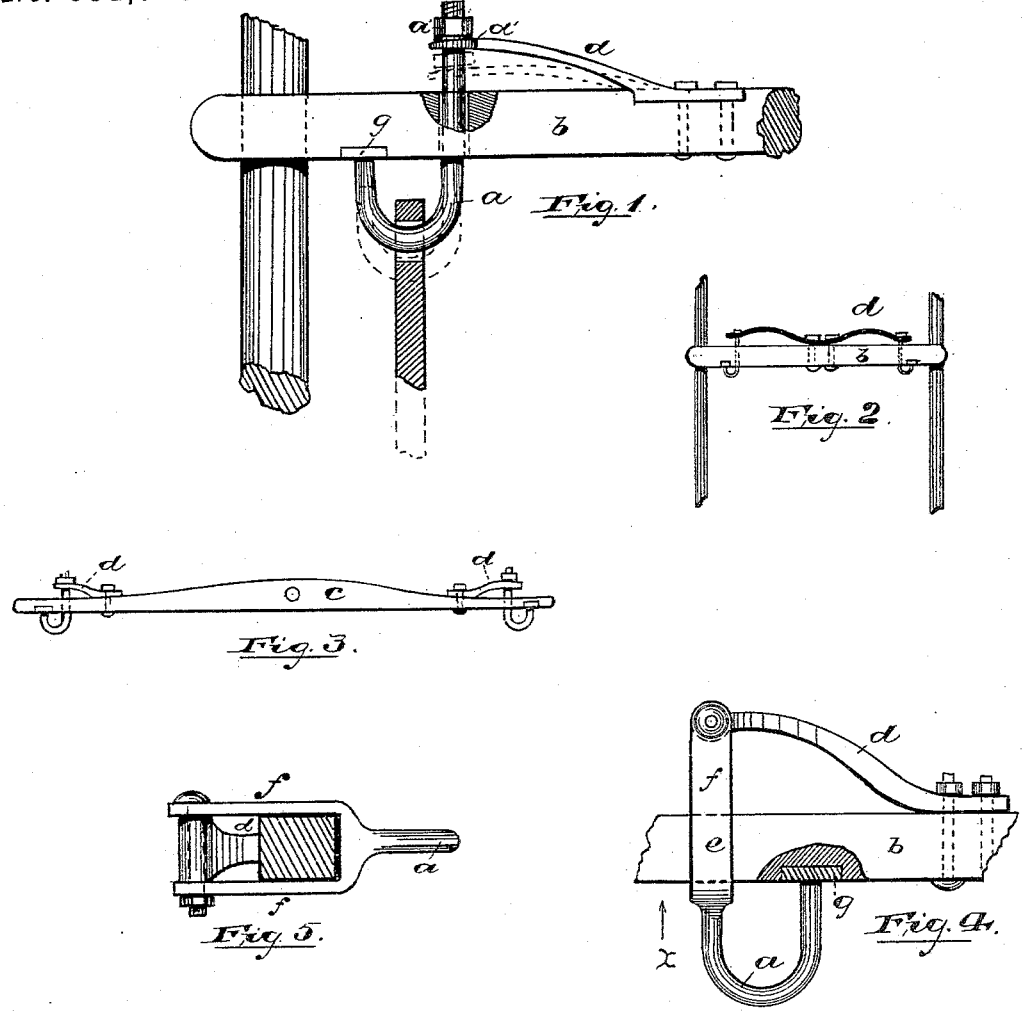

CHARLES G. JACOBUS, OF CEDAR GROVE, NEW JERSEY, ASSIGNOR TO HERBERT H. JACOBUS, OF BROOKLYN, NEW YORK.

WHIFFLETREE-HOOK.

SPECIFICATION forming part of Letters Patent No. 331,715, dated December 1, 1885.

Application filed May 11, 1885. Serial No. 165,022. (No model.)

*To all whom it may concern:*

Be it known that I, CHARLES G. JACOBUS, a citizen of the United States, residing at Cedar Grove, in the county of Essex and State of New Jersey, have invented certain new and useful Improvements in Draft-Bars or Whiffletrees; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In said drawings, above referred to, Figure 1 is a top view of a portion of a pair of shafts having my improved device attached thereto. Fig. 2 is also a plan of a pair of shafts showing one method of construction. Fig. 3 is a plan of a whiffletree. Fig. 4 is a top view of a form adapted for heavy draft, and Fig. 5 is a section through the cross-bar of the shaft on the line $x$.

The object of my invention is twofold—viz., to provide a simple and safe device for securing the traces to the shafts, and, furthermore, to relieve the horse of the dead-weight in starting a heavy load.

The invention consists in the device and in the combination of elements therein, substantially as illustrated in the drawings, and described and claimed hereinafter.

As indicated in the drawings, my invention consists of a hook, $a$, to which the trace is attached, which, for light wagons, passes through the whiffletree-bar $b$, or the whiffletree itself, $c$, and is secured to a spring, $d$, which is bolted to one side of the bar $b$ or tree $c$, as in Figs. 1 and 3. The hook in this form of construction is preferably attached to the spring by passing through an eye, $d'$, in the end thereof, and provided with a nut, $a'$, which prevents the disengagement of the hook from the spring.

For heavy draft, where strength is desired, I prefer the device illustrated in Figs. 4 and 5, which consists of a clip or clevis, $e$, having a hook, $a$, and arms $f$, which extend over and under the bar $b$ and are bolted to the end of the spring, as indicated in Fig. 5. As thus arranged the bar is not weakened, as might be the result if a bolt-perforation were made therethrough, and insures the full strength of the whiffletree-bar. The springs $d$ may be made separate and bolted to the bar, as in Fig. 1, or a single spring extending from one bolt-hook to the other, as in Fig. 2, be used.

While the play of the springs under the movement of the horse is thought sufficient to prevent the rubbing and irritation of the collar upon the shoulders of the horse, still the bolt-hook or clips may be attached upon the whiffletree for a single shaft, and are preferably secured thereto for a double pole. Countersunk in the tree at the point where the end of the hook strikes the said tree is a piece or cushion of rubber, $g$, which prevents the noise resulting from the movement of the parts.

To attach the trace to the hook the hook is drawn away from the tree, so that the trace can be adjusted thereon, and the force of the spring returns the spring to the position indicated in Fig. 1, thus holding the trace securely thereon. Under the pull of the horse the hook is drawn away from the bar $b$, as dotted on Fig. 1; but when the draft of the horse stops, the hook, under the force of the spring, returns to its normal position. By this arrangement it will be apparent that the trace will not be liable to become detached from the hook, since the draft of the horse holds the traces taut when the hook is pulled away from the bar $b$, and the return of the hook to its normal position prevents the disengagement of the trace when the draft of the horse stops.

The spring-and-hook device not only serves to hold the trace securely, but also relieves the horse of the dead-weight in starting the load by strengthening the spring.

I am aware that spring-actuated hooks for whiffletrees have been devised—such as shown in the patent to Agar, No. 145,826. Therefore I do not desire to cover, broadly, a spring-actuated whiffletree-hook; but,

Having thus described my invention, what I claim is—

In a trace-holding device, the combination, with a whiffletree-bar, as b, of a spring-arm, d, bolted to one side of said bar, a clip through which the whiffletree-bar passes, having arms f secured to said spring, and a hook, a, the end of which is normally held in engagement with the opposite side of the whiffletree-bar to which the spring is bolted, by the force of the said spring, and an elastic cushion, g, countersunk in said whiffletree-bar, substantially as and for the purpose set forth.

In testimony that I claim the foregoing I have hereunto set my hand this 22d day of April, 1885.

CHARLES G. JACOBUS.

Witnesses:
FREDK. F. CAMPBELL,
B. L. McNULTY.